United States Patent
Takahiro

[11] 4,095,873
[45] Jun. 20, 1978

[54] MINIATURE AND LARGE APERTURE RETROFOCUS WIDE-ANGLE PHOTOGRAPHIC LENS

[75] Inventor: Sugiyama Takahiro, Tokyo, Japan

[73] Assignee: Asahi Kogaku Kogyo Kabushiki Kaisha, Tokyo, Japan

[21] Appl. No.: 672,935

[22] Filed: Apr. 2, 1976

[30] Foreign Application Priority Data

Apr. 4, 1975 Japan .................. 50-40994

[51] Int. Cl.² .............................. G02B 9/64
[52] U.S. Cl. ............... 350/195; 350/210; 350/214
[58] Field of Search ............ 350/214, 210, 196

[56] References Cited

U.S. PATENT DOCUMENTS 3,512,874  5/1970  Woltche ................ 350/214
3,877,795  4/1975  Yamashita .............. 350/214

*Primary Examiner*—Conrad J. Clark
*Attorney, Agent, or Firm*—Sughrue, Rothwell, Mion, Zinn and Macpeak

[57] ABSTRACT

A miniature and large aperture retrofocus wide-angle photographic lens whose aberration is satisfactorily corrected is composed of five lens groups, A thru E, satisfying the following conditions (I) to (IV):

$$\nu_A, \nu_B > 55 \tag{I}$$

$$\frac{F}{1.2} < |F_{A,B}| < \frac{F}{0.7}, F_{A,B} < 0 \tag{II}$$

$$\frac{F}{0.8} < |F_{A,B,C,D}| < \frac{F}{0.2}, F_{A,B,C,D} < 0 \tag{III}$$

$$F < d_{C,D} < 2F \tag{IV}$$

20 Claims, 35 Drawing Figures

FIG.7
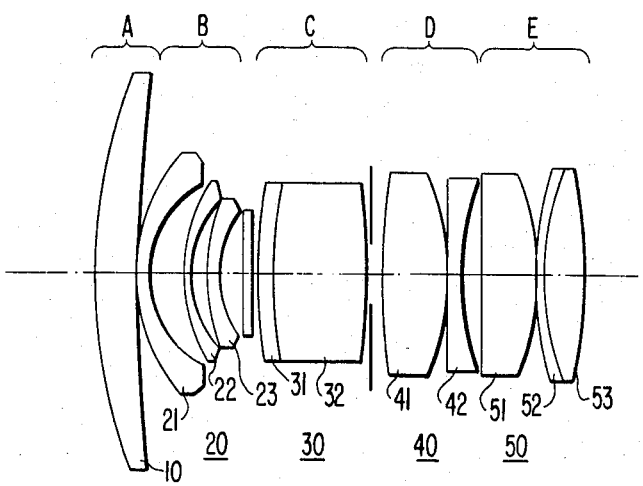
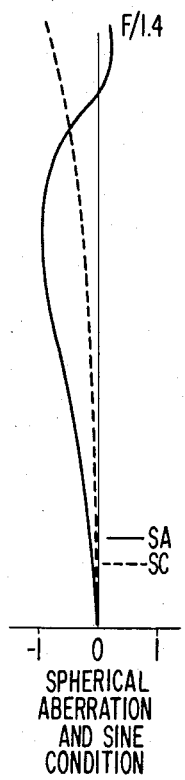
FIG.8a
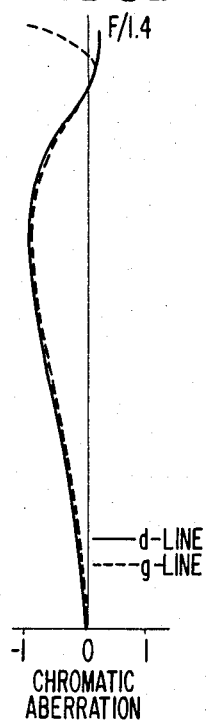
FIG.8b
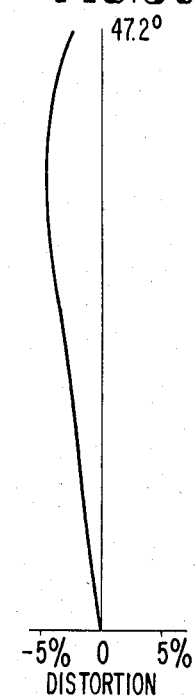
FIG.8c
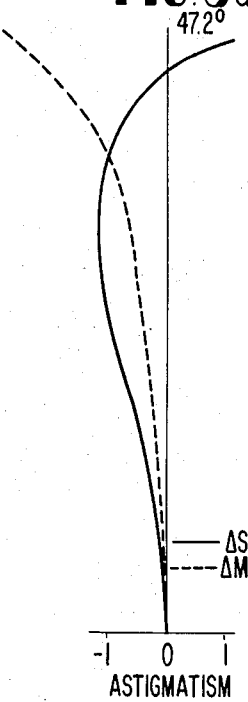
FIG.8d

FIG.13
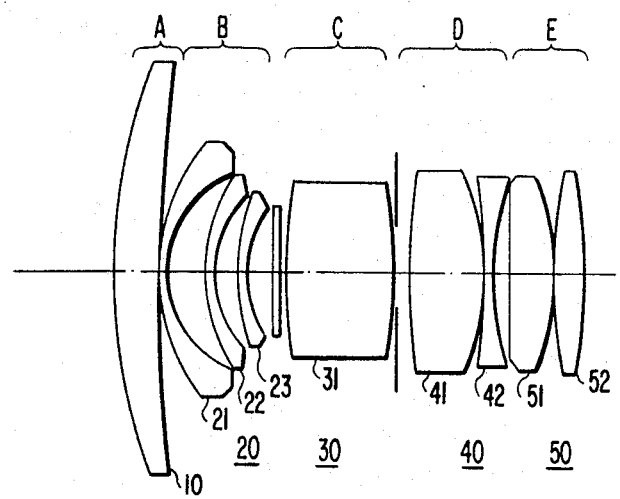
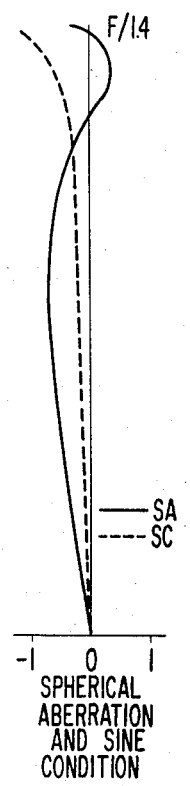
FIG.14a
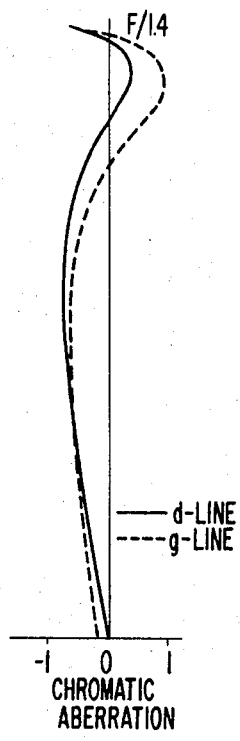
FIG.14b
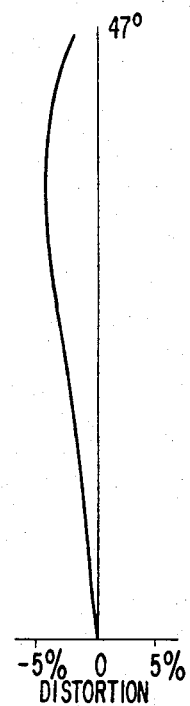
FIG.14c
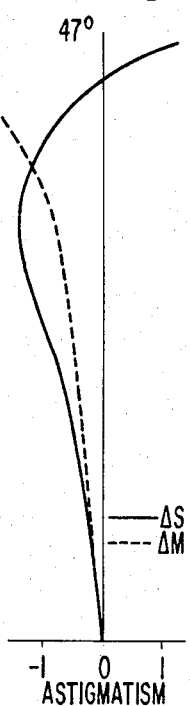
FIG.14d 4,095,873

MINIATURE AND LARGE APERTURE RETROFOCUS WIDE-ANGLE PHOTOGRAPHIC LENS

SUMMARY OF THE INVENTION

This invention relates to a retrofocus wide-angle photographic lens having an aperture ratio of 1:1.4 and a large angular field of 95°. The invention successfully maintains a sufficient back focal length, provides correction of various types of aberrations despite the extreme brightness of a lens having an aperture ratio of 1:1.4, and is relatively small in size.

This is accomplished by providing a lens system having five lens components satisfying the following conditions (I) to (IV):

$$\nu_A, \nu_B > 55 \quad \text{(I)}$$

$$\frac{F}{1.2} < |F_{A.B}| < \frac{F}{0.7}, F_{A.B} < 0 \quad \text{(II)}$$

$$\frac{F}{0.8} < |F_{A.B.C.D}| < \frac{F}{0.2}, F_{A.B.C.D} < 0 \quad \text{(III)}$$

$$F < d_{C.D} < 2F \quad \text{(IV)}$$

where
- F: the resultant focal length of the entire system,
- $F_{A.B....i}$: the resultant focal length to the $i$ group,
- $r_j$: the radius of curvature of the $j$ surface of the lenses, counting from the first lens surface nearest the objective side,
- $d_j$: the thickness of air gap between the $j$ and $j+1$ surfaces,
- $N_k$: the refractive index of the $k$th lens
- $\nu_k$: Abbe's number for the $k$th lens
- $\nu_A$: The Abbe's number of the positive lens within A group
- $\nu_B$: The average Abbe's number of the negative lens within B group
- $d_{C.D}$: The distance along the optical axis between the first surface of C group and the last surface of D group

BRIEF DESCRIPTION OF THE DRAWINGS

The specific nature of the invention, as well as other objects, aspects, uses and advantages thereof, will clearly appear from the following description and from the accompanying drawings, in which:

FIG. 7 is a longitudinal view showing the lens system in accordance with the fourth embodiment of the invention;

FIGS. 8a to 8d show aberration curves obtained by the lens system in accordance with the fourth embodiment of the invention;

FIG. 13 is a longitudinal view showing the lens system in accordance with the seventh embodiment of the invention;

FIGS. 14a to 14d show aberration curves obtained by the lens system in accordance with the seventh embodiment of the invention;

DETAILED DESCRIPTION OF THE INVENTION

Figure 1:
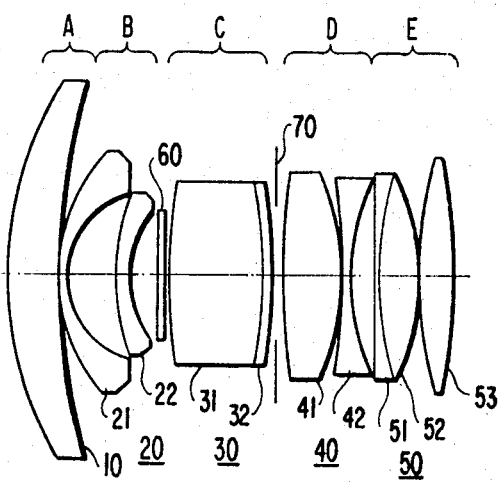
FIG. 1 is a longitudinal view showing the lens system in accordance with the first embodiment of the invention.
Figure 2A:
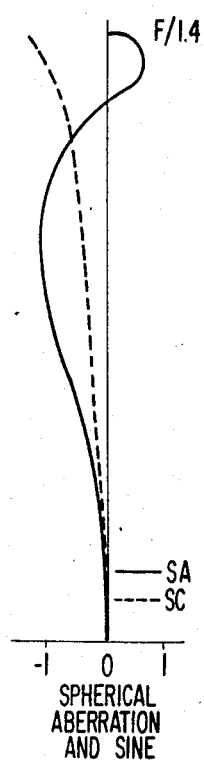
FIGS. 2a and 2d show aberration curves obtained by the lens system in accordance with the first embodiment of the invention.
Figure 2B:
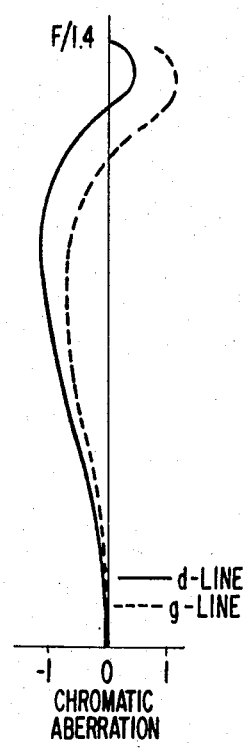
Figure 2C:
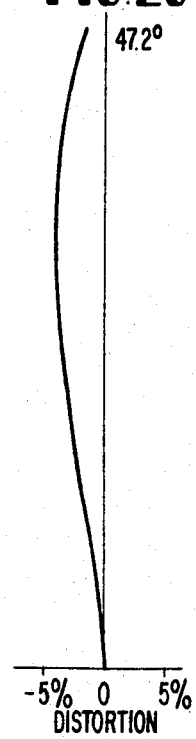
Figure 2D:
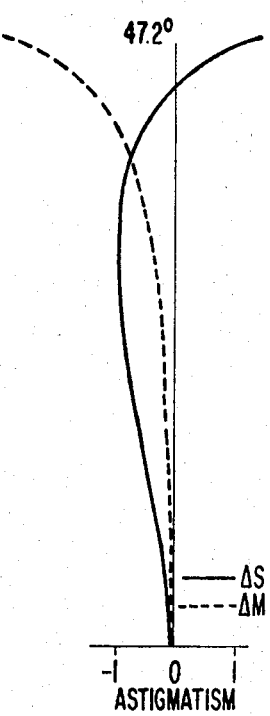
Figure 3:
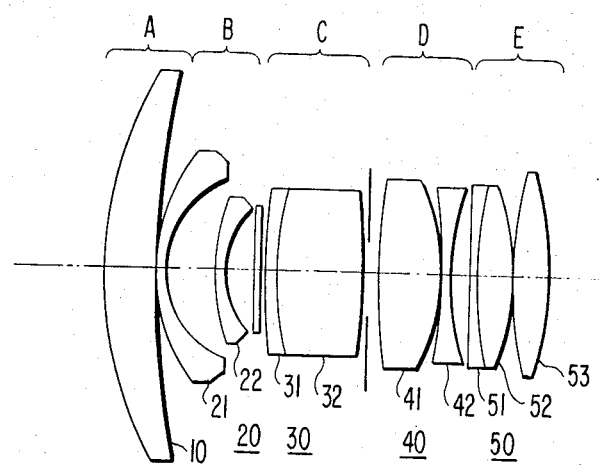
FIG. 3 is a longitudinal view showing the lens system in accordance with the second embodiment of the invention.
Figure 4A:
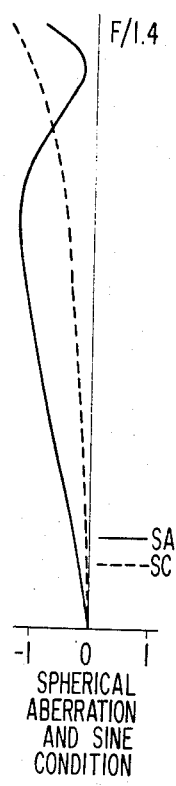
FIGS. 4a to 4d show aberration curves obtained by the lens system in accordance with the second embodiment of the invention.
Figure 4B:
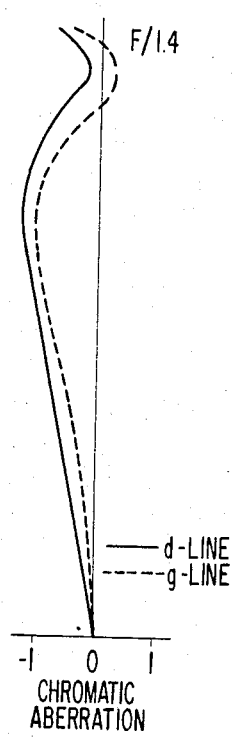
Figure 4C:
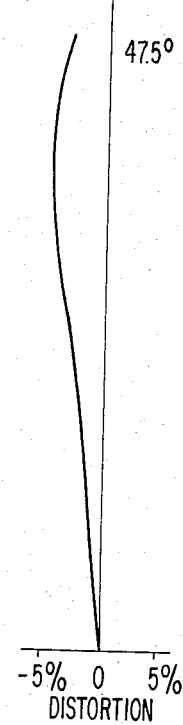
Figure 4D:
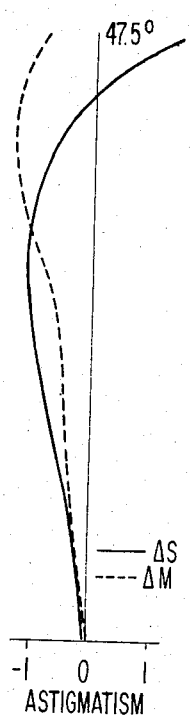
Figure 5:
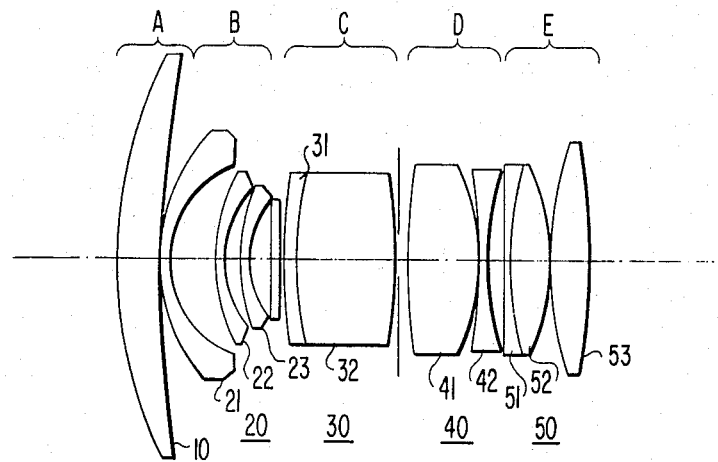
FIG. 5 is a longitudinal view showing the lens system in accordance with the third embodiment of the invention.
Figure 6A:
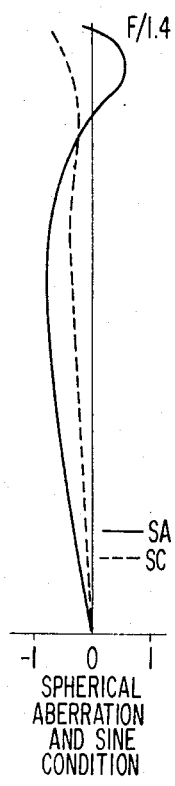
FIGS. 6a to 6d show aberration curves obtained by the lens system in accordance with the third embodiment of the invention.
Figure 6B:
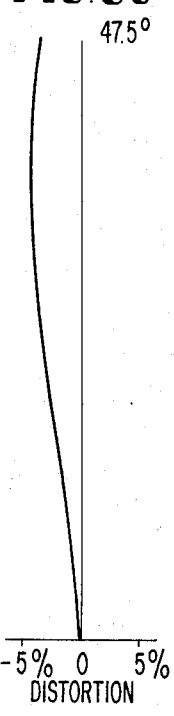
Figure 6C:
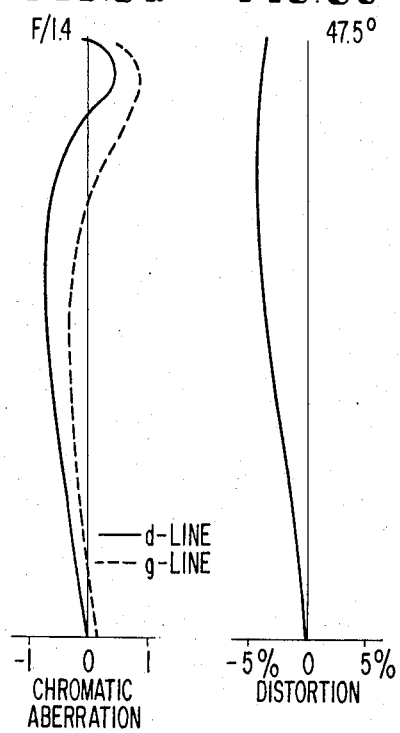
Figure 6D:
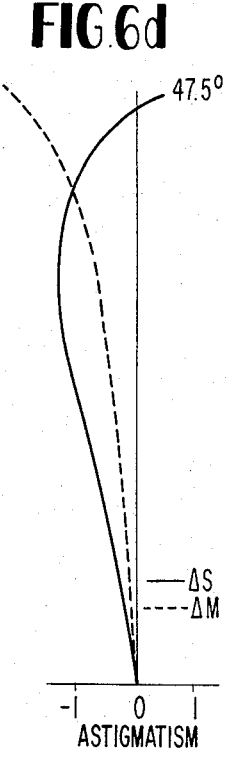
Figure 9:
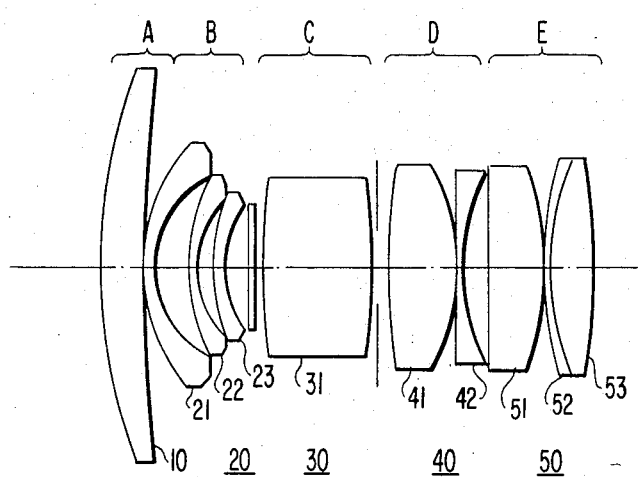
FIG. 9 is a longitudinal view showing the lens system in accordance with the fifth embodiment of the invention
Figure 10A:
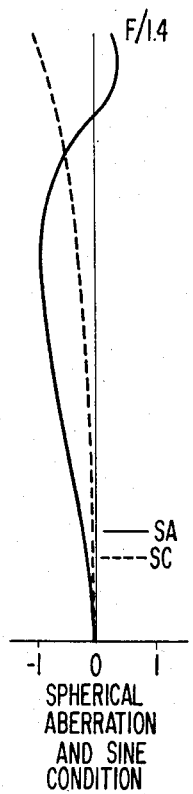
FIGS. 10a to 10d show aberration curves obtained by the lens system in accordance with the fifth embodiment of the invention.
Figure 10B:
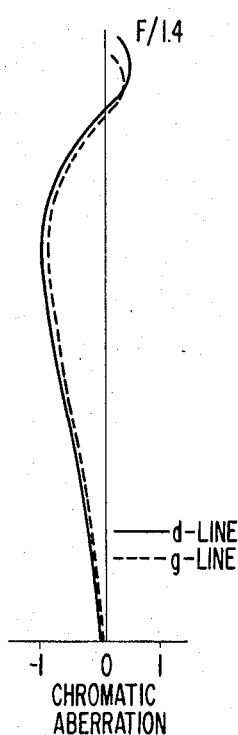
Figure 10C:
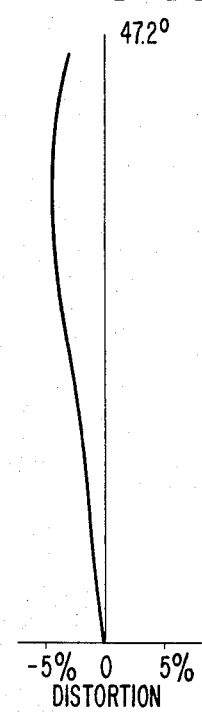
Figure 10D:
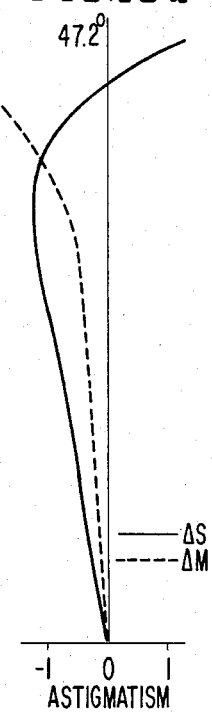
Figure 11:
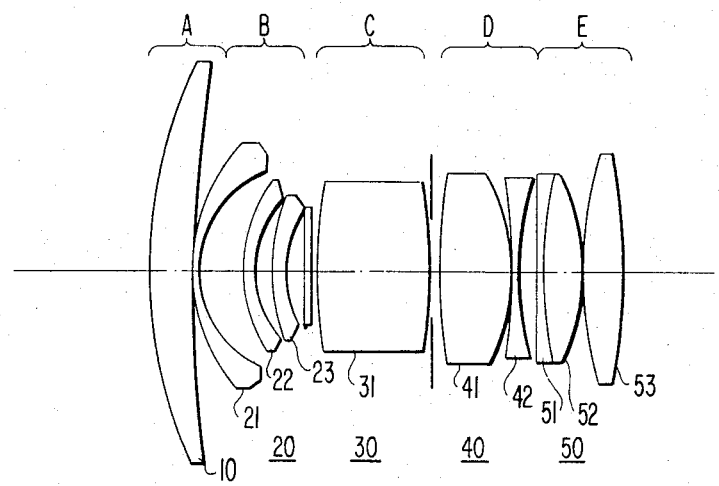
FIG. 11 is a longitudinal view showing the lens system in accordance with the sixth embodiment of the invention.
Figure 12A:
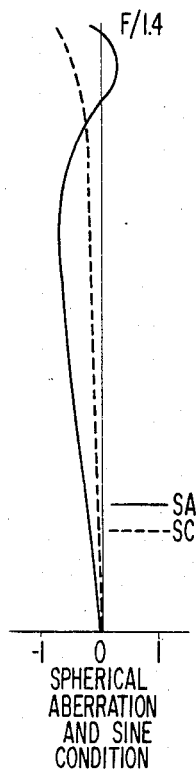
FIGS. 12a to 12d show aberration curves obtained by the lens system in accordance with the sixth embodiment of the invention.
Figure 12B:
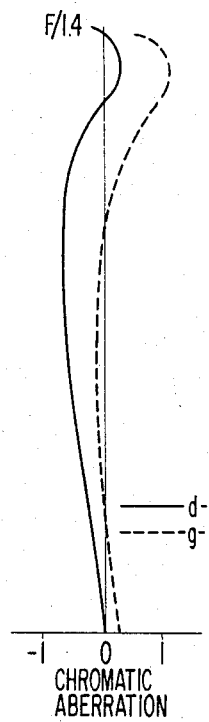
Figure 12C:
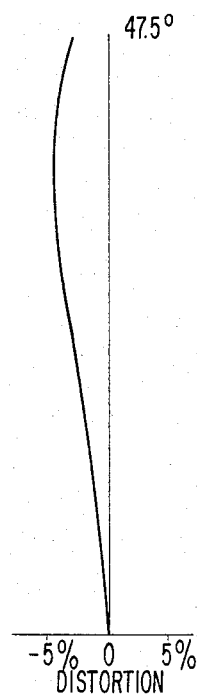
Figure 12D:
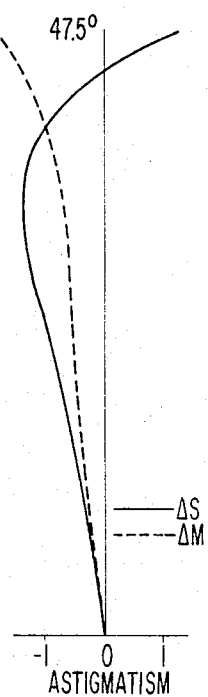

According to the present invention, as shown in each of the seven embodiments of FIGS. 1, 3, 5, 7, 9, 11 and 13, there is provided a lens system consisting of five groups identified as A thru E. The A group comprises a positive lens 10. The B group is a negative meniscus lens 20 with its convex surface directed toward the object side of the lens system. The lens 20 may consist of two negative meniscus lenses 21 and 22, as shown in FIGS. 1 and 3, or three negative meniscus lenses 21, 22 and 23 as shown in FIGS. 5, 7, 9, 11 and 13. The C group is a positive lens 30 consisting of either a single positive lens element 31 as shown in FIGS. 9, 11 and 13, or positive and negative lens elements 31 and 32 joined together as shown in FIGS. 1, 3, 5 and 7. The D group has a positive resultant focal length and is in the form of a compound lens comprising positive and negative lenses 41 and 42, respectively. The E group has a positive resultant focal length and consists of either, two single lens elements 51 and 52 as shown in FIG. 13, a single lens element 53 and a positive lens consisting of joined positive and negative lens elements 51 and 52, as shown in FIGS. 1, 3, 5, and 11, or a single lens element 51 and a positive lens consisting of joined positive and negative lens elements 52 and 53, as shown in FIGS. 7 and 9. A filter 60 is interposed between the B group, and the C group, and a diaphragm 70 is interposed between the C group and said the D group.

The wide-angle lens according to the invention is characterized by the following four conditions as noted below, which will be described in greater detail later:

$$\nu_A, \nu_B > 55 \quad \text{(I)}$$

$$\frac{F}{1.2} < |F_{A.B}| < \frac{F}{0.7}, F_{A.B} < 0 \quad \text{(II)}$$

$$\frac{F}{0.8} < |F_{A.B.C.D}| < \frac{F}{0.2}, F_{A.B.C.D} < 0 \quad \text{(III)}$$

$$F < d_{C.D} < 2F \quad \text{(IV)}$$

wherein the terms in the equations are as defined previously.

The various conditions as described above will be explained in detail in the following.

Condition (I)
$$\nu_A, \nu_B > 55$$

This condition is provided to reduce the difference between chromatic aberrations of the multiplying factor in the peripheral and midportions of the image plane. When the angular field is more than 95°, the chromatic aberration of the multiplying factor in the peripheral portion of the image plane is greater, in comparison with that in the midportion of the image plane. In particular, the chromatic aberrations tend to occur in A and B groups, which have large incident angles. If $\nu_A$ and $\nu_B$ are smaller than 55, there will be excessive chromatic aberration which would have to be compensated for by an excessive converging system following the C group. Thus, condition (I) is desirable.

Condition (II)
$$\frac{F}{1.2} < |F_{A.B}| < \frac{F}{0.7}, F_{A.B} < 0$$

This condition is provided to obtain the back focal length required for attaching the lens to a camera. If $|F_{A.B}|$ is greater than the upper limit (F/0.7), it would be necessary, in order to obtain the necessary back focal length, to increase the spacing or thickness of converging systems after the B group. Furthermore, in order to obtain the same quantity of peripheral light, it would be necessary to design the lens system so that the A, B and E groups have a greater diameter resulting in a larger lens system, which is contrary to the object of minituarization. On the other hand, if $|F_{A.B}|$ is smaller than the lower limit (F/1.2), the required back focal length could be readily obtained with a minituarized lens system. However, this would result in a shortening of the focal length of the covering system after the B group and a decrease in the sum of Petzval thereby leading to an undesirable increase of the spherical aberration and the coma aberration.

Condition (III)
$$\frac{F}{0.8} < |F_{A.B.C.D}| < \frac{F}{0.2}, F_{A.B.C.D} < 0$$

This condition is important to correct satisfactorily the coma aberration and simultaneously to obtain the required back focal length. If $|F_{A.B.C.D}|$ is greater than the upper limit (F/0.2), it would be necessary to increase the lens thickness of the C group or the air spacing along the optical axis between the C and D groups in order to obtain the necessary back focal length. However, that would result in a larger lens system but a smaller quantity of light passing therethrough. If an attempt is made to obtain the same quantity of light, the diameter of lenses of A, B and E groups would have to be larger. This would result in a larger lens system, which will not satisfy the object of miniturization. On the other hand, if $|F_{A.B.C.D}|$ is smaller than the lower limit (F/0.8), the required back focal length would be readily obtainable. However, this would result in a shortening of the focal length of the positive lens of the E group and a decrease in the radius of curvature below that required, thereby undesirably increasing the coma aberration.

Condition (IV)
$$F < d_{C.D} < 2F$$

This condition is important in maintaining the balance of aberrations, particularly, the balance of the coma aberration. If $d_{C.D}$ is less than the lower limit F, and assuming that the resultant focal length of the C and D group is constant, the height of light incident upon and emitted from the C and D groups regarding to the light above the diaphragm and the light below the diaphragm become lower. As a result the radius of curvature of the C and D groups would have to be further reduced and the action to the coma aberration would have to be further enhanced in order to correct the coma aberration, thus leading an increase in the spherical aberration. On the other hand, if $d_{C.D}$ is greater than the upper limit, 2F, the height of light incident upon and emitted from the C and D groups becomes higher. This results in that action of light passing above the diaphragm and of light passing below the diaphragm must be enhanced to readily maintain the balance of the coma aberration, while the overall length of lens system becomes longer and simultaneously when an attempt is made to obtain the same quantity of light, the lenses of A, B and E groups must be designed to have a greater diameter thereof.

According to the specific feature of the invention, there is provided a wide angle photographic lens having an aperture ratio of 1:1.4 and a large angular field of 95°, which can maintain sufficient back focal length and properly correct various aberrations despite the extreme brightness of the lens, while maintaining the lens system in a miniaturized type.

Seven specific examples of the invention are illustrated in FIGS. 1, 3, 5, 7, 9, 11 and 13. The parameters for these examples are given in Examples 1, 2, 3, 4, 5, 6 and 7 below. The aberration curves for the seven specific examples are given in FIGS. 2, 4, 6, 8, 10, 12 and 14, respectively.

The lens data in Examples 1, 2, 3, 4, 5, 6 and 7, according to the present invention are given below for a lens system having a resultant focal length F = 100

Example 1

Aperture ratio 1 : 1.4  Angular field 94.5°

| lens # | Radius of Curvature r | Lens Thickness or Distance d | Refractive Index N/ Abbe No. $\nu$ |
|---|---|---|---|
| 1 | $r_1 = 282.073$ | $d_1 = 38.390$ | $N_1/\nu_1 = 1.61800/63.4$ |
| 1 | $r_2 = 857.893$ | $d_2 = 0.488$ | |
| 2 | $r_3 = 141.907$ | $d_3 = 5.878$ | $N_2/\nu_2 = 1.64000/60.2$ |
| 2 | $r_4 = 68.712$ | $d_4 = 41.707$ | |
| 3 | $r_5 = 166.702$ | $d_5 = 5.854$ | $N_3/\nu_3 = 1.61800/63.4$ |
| 3 | $r_6 = 67.168$ | $d_6 = 24.878$ | |
| filter | $\infty$ | 7.317 | 1.51633/64.1 |
| filter | $\infty$ | 2.537 | |
| 4 | $r_7 = 484.917$ | $d_7 = 76.927$ | $N_4/\nu_4 = 1.80518/25.4$ |
| 4 & 5 | $r_8 = -250.893$ | $d_8 = 6.244$ | $N_5/\nu_5 = 1.71700/47.9$ |
| 5 | $r_9 = -574.546$ | $d_9 = 13.658$ | |
| 6 | $r_{10} = 551.585$ | $d_{10} = 47.659$ | $N_6/\nu_6 = 1.73400/51.5$ |
| 6 | $r_{11} = -150.249$ | $d_{11} = 0.390$ | |
| 7 | $r_{12} = -384.688$ | $d_{12} = 5.854$ | $N_7/\nu_7 = 1.84666/23.9$ |
| 7 | $r_{13} = 198.849$ | $d_{13} = 17.268$ | |
| 8 | $r_{14} = -1536.502$ | $d_{14} = 5.854$ | $N_8/\nu_8 = 1.84666/23.9$ |
| 8 & 9 | $r_{15} = 400.410$ | $d_{15} = 32.780$ | $N_9/\nu_9 = 1.69680/55.5$ |
| 9 | $r_{16} = -157.551$ | $d_{16} = 0.488$ | |
| 10 | $r_{17} = 322.741$ | $d_{17} = 26.366$ | $N_{10}/\nu_{10} = 1.77250/49.7$ |
| 10 | $r_{18} = -470.980$ | | | back focal length = 179.000
$F_{A.B} = -116.836$
$F_{A.B.C.D} = -237.079$
$d_{C.D} = 150.732$
Sum of Petzval = 0.090

Example 1-continued

Aperture ratio 1 : 1.4  Angular field 94.5°

| lens # | Radius of Curvature r | Lens Thickness or Distance d | Refractive Index N/ Abbe No. $\nu$ |
|---|---|---|---|

All linear dimensions are given in millimeters

Example 2

Aperture ratio 1 : 1.4  Angular field 95°

| lens # | Radius of Curvature r | Lens Thickness or Distance d | Refractive Index N/ Abbe No. $\nu$ |
|---|---|---|---|
| 1 | $r_1 = 290.595$ | $d_1 = 41.024$ | $N_1/\nu_1 = 1.61800/63.4$ |
| 1 | $r_2 = 867.896$ | $d_2 = 0.488$ | |
| 2 | $r_3 = 146.068$ | $d_3 = 5.854$ | $N_2/\nu_2 = 1.64000/60.2$ |
| 2 | $r_4 = 70.405$ | $d_4 = 43.805$ | |
| 3 | $r_5 = 164.917$ | $d_5 = 5.854$ | $N_3/\nu_3 = 1.61800/63.4$ |
| 3 | $r_6 = 66.983$ | $d_6 = 24.732$ | |
| filter | $\infty$ | 7.317 | 1.51633/64.1 |
| filter | $\infty$ | 2.439 | |
| 4 | $r_7 = 497.780$ | $d_7 = 9.756$ | $N_4/\nu_4 = 1.72000/50.2$ |
| 4 & 5 | $r_8 = 243.902$ | $d_8 = 70.732$ | $N_5/\nu_5 = 1.80518/25.4$ |
| 5 | $r_9 = -557.507$ | $d_9 = 13.659$ | |
| 6 | $r_{10} = 558.663$ | $d_{10} = 49.854$ | $N_6/\nu_6 = 1.72916/54.7$ |
| 6 | $r_{11} = -146.740$ | $d_{11} = 0.390$ | |
| 7 | $r_{12} = -369.015$ | $d_{12} = 6.829$ | $N_7/\nu_7 = 1.84666/23.9$ |
| 7 | $r_{13} = 194.379$ | $d_{13} = 17.024$ | |
| 8 | $r_{14} = -1876.346$ | $d_{14} = 5.805$ | $N_8/\nu_8 = 1.84666/23.9$ |
| 8 & 9 | $r_{15} = 539.834$ | $d_{15} = 29.512$ | $N_9/\nu_9 = 1.69680/55.5$ |
| 9 | $r_{16} = -166.635$ | $d_{16} = 0.488$ | |
| 10 | $r_{17} = 340.673$ | $d_{17} = 26.439$ | $N_{10}/\nu_{10} = 1.77250/49.7$ |
| 10 | $r_{18} = 375.661$ | | | back focal length = 178.161
$F_{A.B} = -117.288$
$F_{A.B.C.D} = -223.214$
$d_{C.D} = 151.220$
Sum of Petzval = 0.097
All linear dimensions are given in millimeters

Example 3

Aperture ratio 1 : 1.4  Angular field 95°

| lens # | Radius of Curvature r | Lens Thickness or Distance d | Refractive Index/ Abbe No. $\nu$ |
|---|---|---|---|
| 1 | $r_1 = 349.515$ | $d_1 = 33.883$ | $N_1/\nu_1 = 1.61800/63.4$ |
| 1 | $r_2 = 1026.524$ | $d_2 = 0.485$ | |
| 2 | $r_3 = 134.820$ | $d_3 = 5.825$ | $N_2/\nu_2 = 1.61800/63.4$ |
| 2 | $r_4 = 76.010$ | $d_4 = 36.650$ | |
| 3 | $r_5 = 122.500$ | $d_5 = 5.825$ | $N_3/\nu_3 = 1.61800/63.4$ |
| 3 | $r_6 = 77.874$ | $d_6 = 15.631$ | |
| 4 | $r_7 = 160.796$ | $d_7 = 5.874$ | $N_4/\nu_4 = 1.61800/63.4$ |
| 4 | $r_8 = 79.277$ | $d_8 = 19.417$ | |
| filter | $\infty$ | 7.282 | 1.51633/64.1 |
| filter | $\infty$ | 2.427 | |
| 5 | $r_9 = 358.447$ | $d_9 = 10.874$ | $N_5/\nu_5 = 1.69680/55.5$ |
| 5 & 6 | $r_{10} = 277.141$ | $d_{10} = 78.350$ | $N_6/\nu_6 = 1.80518/25.4$ |
| 6 | $r_{11} = -611.117$ | $d_{11} = 13.592$ | |
| 7 | $r_{12} = 614.078$ | $d_{12} = 56.699$ | $N_7/\nu_7 = 1.72000/50.2$ |
| 7 | $r_{13} = -152.981$ | $d_{13} = 0.388$ | |
| 8 | $r_{14} = -465.534$ | $d_{14} = 5.825$ | $N_8/\nu_8 = 1.84666/23.9$ |
| 8 | $r_{15} = 198.544$ | $d_{15} = 15.243$ | |
| 9 | $r_{16} = \infty$ | $d_{16} = 5.874$ | $N_9/\nu_9 = 1.84666/23.9$ |
| 9 & 10 | $r_{17} = 386.976$ | $d_{17} = 31.893$ | $N_{10}/\nu_{10} = 1.61800/63.4$ |
| 10 | $r_{18} = -162.636$ | $d_{18} = 0.485$ | |
| 11 | $r_{19} = 291.641$ | $d_{19} = 29.612$ | $N_{11}/\nu_{11} = 1.75700/47.9$ |
| 11 | $r_{20} = -449.447$ | | |

Back focal length = 181.155
$F_{A.B} = -108.554$
$F_{A.B.C.D} = -232.072$
$d_{C.D} = 165.728$
Sum of Petzval = 0.102
All linear dimensions are given in millimeters

Example 4

Aperture ratio 1 : 1.4  Angular field 94.5°

| Lens # | Radius of Curvature r | Lens Thickness of Distance d | Refractive Index N/ Abbe No. $\nu$ |
|---|---|---|---|
| 1 | $r_1 = 427.020$ | $d_1 = 34.858$ | $N_1/\nu_1 = 1.61800/63.4$ |
| 1 | $r_2 = 1503.451$ | $d_2 = 0.485$ | |
| 2 | $r_3 = 139.474$ | $d_3 = 7.069$ | $N_2/\nu_2 = 1.62041/60.3$ |

Example 4-continued

Aperture ratio 1 : 1.4  Angular field 94.5°

| Lens # | Radius of Curvature r | Lens Thickness of Distance d | Refractive Index N/ Abbe No. $\nu$ |
|---|---|---|---|
| 2 | $r_4 = 77.004$ | $d_4 = 29.367$ | |
| 3 | $r_5 = 129.595$ | $d_5 = 5.908$ | $N_3/\nu_3 = 1.61800/63.4$ |
| 3 | $r_6 = 81.507$ | $d_6 = 15.705$ | |
| 4 | $r_7 = 148.761$ | $d_7 = 5.370$ | $N_4/\nu_4 = 1.62041/60.3$ |
| 4 | $r_8 = 75.801$ | $d_8 = 23.062$ | |
| filter | $\infty$ | 7.282 | 1.51633/64.1 |
| filter | $\infty$ | 1.876 | |
| 5 | $r_9 = 357.740$ | $d_9 = 10.712$ | $N_5/\nu_5 = 1.69350/53.3$ |
| 5 & 6 | $r_{10} = 382.976$ | $d_{10} = 79.048$ | $N_6/\nu_6 = 1.80518/25.4$ |
| 6 | $r_{11} = -713.896$ | $d_{11} = 13.592$ | |
| 7 | $r_{12} = 628.800$ | $d_{12} = 56.899$ | $N_7/\nu_7 = 1.72000/50.2$ |
| 7 | $r_{13} = -160.170$ | $d_{13} = 0.388$ | |
| 8 | $r_{14} = -723.035$ | $d_{14} = 5.819$ | $N_8/\nu_8 = 1.84666/23.9$ |
| 8 | $r_{15} = 189.463$ | $d_{15} = 16.275$ | |
| 9 | $r_{16} = 1358.156$ | $d_{16} = 47.573$ | $N_9/\nu_9 = 1.75700/47.9$ |
| 9 | $r_{17} = -197.235$ | $d_{17} = 0.485$ | |
| 10 | $r_{18} = 285.591$ | $d_{18} = 5.810$ | $N_{10}/\nu_{10} = 1.84666/23.9$ |
| 10 & 11 | $r_{19} = 180.289$ | $d_{19} = 33.113$ | $N_{11}/\nu_{11} = 1.61800/60.3$ |
| 11 | $r_{20} = -450.043$ | | |

Back focal length = 178.650
$F_{A.B} = -106.564$
$F_{A.B.C.D} = -223.914$
$d_{C.D} = 166.458$
Sum of petzval = 0.082
All linear dimensions are given in millimeters

Example 5

Aperture ratio 1 : 1.4  Angular field 94.5°

| Lens # | Radius of Curvature r | Lens Thickness or Distance D | Refractive Index N/ Abbe No. $\nu$ |
|---|---|---|---|
| 1 | $r_1 = 427.020$ | $d_1 = 34.858$ | $N_1/\nu_1 = 1.61800/63.4$ |
| 1 | $r_2 = 1503.451$ | $d_2 = 0.485$ | |
| 2 | $r_3 = 139.474$ | $d_3 = 7.069$ | $N_2/\nu_2 = 1.62041/60.3$ |
| 2 | $r_4 = 77.004$ | $d_4 = 29.367$ | |
| 3 | $r_5 = 129.595$ | $d_5 = 5.908$ | $N_3/\nu_3 = 1.61800/63.4$ |
| 3 | $r_6 = 81.507$ | $D_6 = 15.705$ | |
| 4 | $r_7 = 148.761$ | $d_7 = 5.370$ | $N_4/\nu_4 = 1.62041/60.3$ |
| 4 | $r_8 = 75.801$ | $d_8 = 23.062$ | |
| filter | $\infty$ | 7.282 | 1.51633/64.1 |
| filter | $\infty$ | 1.876 | |
| 5 | $r_9 = 357.740$ | $d_9 = 89.760$ | $N_5/\nu_5 = 1.78472/25.7$ |
| 5 | $r_{10} = -674.300$ | $d_{10} = 13.592$ | |
| 6 | $r_{11} = 628.800$ | $d_{11} = 56.899$ | $N_6/\nu_6 = 1.72000/50.2$ |
| 6 | $r_{12} = -160.350$ | $d_{12} = 0.388$ | |
| 7 | $r_{13} = -723.035$ | $d_{13} = 5.819$ | $N_7/\nu_7 = 1.84666/23.9$ |
| 7 | $r_{14} = 189.677$ | $d_{14} = 16.275$ | |
| 8 | $r_{15} = 1358.156$ | $d_{15} = 47.573$ | $N_8/\nu_8 = 1.75700/47.9$ |
| 8 | $r_{16} = -197.417$ | $d_{16} = 0.485$ | |
| 9 | $r_{17} = 285.591$ | $d_{17} = 5.810$ | $N_9/\nu_9 = 1.84666/23.9$ |
| 9 & 10 | $r_{18} = 180.289$ | $d_{18} = 33.113$ | $N_{10}/\nu_{10} = 1.61800/60.3$ |
| 10 | $r_{19} = -450.927$ | | |

Back focal length = 178.806
$F_{A.B} = -106.564$
$F_{A.B.C.D} = -223.914$
$d_{C.D} = 166.458$
Sum of Petzval = 0.084
All linear dimensions are given in millimeters

Example 6

Aperture ratio 1 : 1.4  Angular field 95°

| Lens # | Radius of Curvature r | Lens Thickness or Distance d | Refractive Index N/ Abbe No. $\nu$ |
|---|---|---|---|
| 1 | $r_1 = 349.515$ | $d_1 = 33.883$ | $N_1/\nu_1 = 1.62041/60.3$ |
| 1 | $r_2 = 1019.316$ | $d_2 = 0.485$ | |
| 2 | $r_3 = 134.820$ | $d_3 = 5.825$ | $N_2/\nu_2 = 1.61800/63.4$ |
| 2 | $r_4 = 76.000$ | $d_4 = 36.650$ | |
| 3 | $r_5 = 122.578$ | $d_5 = 5.825$ | $N_3/\nu_3 = 1.61800/63.4$ |
| 3 | $r_6 = 77.949$ | $d_6 = 15.631$ | |
| 4 | $r_7 = 160.757$ | $d_7 = 5.874$ | $N_4/\nu_4 = 1.61800/63.4$ |
| 4 | $r_8 = 79.284$ | $d_8 = 19.417$ | |
| filter | $\infty$ | 7.282 | 1.51633/64.1 |
| filter | $\infty$ | 2.427 | |
| 5 | $r_9 = 351.942$ | $d_9 = 89.223$ | $N_{5/\nu 5} = 1.80518/25.4$ |
| 5 | $r_{10} = -589.338$ | $d_{10} = 13.592$ | |
| 6 | $r_{11} = 613.859$ | $d_{11} = 56.699$ | $N_6/\nu_6 = 1.71700/47.9$ |
| 6 | $r_{12} = -152.055$ | $d_{12} = 0.388$ | |
| 7 | $r_{13} = -465.534$ | $d_{13} = 5.825$ | $N_7/\nu_7 = 1.84666/23.9$ |
| 7 | $r_{14} = 198.267$ | $d_{14} = 15.243$ | |

Example 6-continued

Aperture ratio 1 : 1.4   Angular field 95°

| Lens # | Radius of Curvature r | Lens Thickness or Distance d | Refractive Index N/ Abbe No. ν |
|---|---|---|---|
| 8 | $r_{15} = \infty$ | $d_{15} = 5.874$ | $N_8/\nu_8 = 1.84666/23.9$ |
| 8 & 9 | $r_{16} = 387.102$ | $d_{16} = 31.893$ | $N_9/\nu_9 = 1.61800/63.4$ |
| 9 | $r_{17} = -162.626$ | $d_{17} = 0.485$ | |
| 10 | $r_{18} = 291.748$ | $d_{18} = 29.612$ | $N_{10}/\nu_{10} = 1.75700/47.9$ |
| 10 | $r_{19} = -447.530$ | | |

Back focal length = 180.966
$F_{A.B.} = -108.554$
$F_{A.B.C.D} = -232.072$
$d_{C.D} = 165.727$
Sum of Petzval = 0.105
All linear dimensions are given in millimeters

Example 7

Aperture ratio 1 : 1.4   Angular field 94°

| Lens # | Radius of Curvature r | Lens Thickness or Distance d | Refractive Index N/ Abbe No. ν |
|---|---|---|---|
| 1 | $r_1 = 408.859$ | $d_1 = 35.151$ | $N_1/\nu_1 = 1.61800/63.4$ |
| 1 | $r_2 = 1326.694$ | $d_2 = 0.485$ | |
| 2 | $r_3 = 142.718$ | $d_3 = 5.828$ | $N_2/\nu_2 = 1.61800/63.4$ |
| 2 | $r_4 = 78.421$ | $d_4 = 32.426$ | |
| 3 | $r_5 = 128.290$ | $d_5 = 5.865$ | $N_3/\nu_3 = 1.61800/63.4$ |
| 3 | $r_6 = 81.441$ | $d_6 = 18.980$ | |
| 4 | $r_7 = 161.794$ | $d_7 = 5.842$ | $N_4/\nu_4 = 1.61800/63.4$ |
| 4 | $r_8 = 78.193$ | $d_8 = 22.788$ | |
| filter | $\infty$ | 7.282 | 1.51633/64.1 |
| filter | $\infty$ | 0.485 | |
| 5 | $r_9 = 325.243$ | $d_9 = 88.180$ | $N_5/\nu_5 = 1.80518/25.4$ |
| 5 | $r_{10} = -381.074$ | $d_{10} = 13.592$ | |
| 6 | $r_{11} = 807.840$ | $d_{11} = 60.410$ | $N_6/\nu_6 = 1.72916/54.7$ |
| 6 | $r_{12} = -156.014$ | $d_{12} = 0.388$ | |
| 7 | $r_{13} = -497.315$ | $d_{13} = 7.661$ | $N_7/\nu_7 = 1.92286/20.9$ |
| 7 | $r_{14} = 194.265$ | $d_{14} = 15.638$ | |
| 8 | $r_{15} = -4152.361$ | $d_{15} = 34.213$ | $N_8/\nu_8 = 1.72916/54.7$ |
| 8 | $r_{16} = -187.957$ | $d_{16} = 0.485$ | |
| 9 | $r_{17} = 336.916$ | $d_{17} = 22.550$ | $N_9/\nu_9 = 1.72916/54.7$ |
| 9 | $r_{18} = -403.796$ | | |

Back focal length = 179.427
$F_{A.B.} = 170.231$
Sum of Petzval = 0.099
All linear dimensions are given in millimeters.
$F_{A.B.C.D} = -223.914$

What is claimed is:

1. A wide angle photographic lens system comprising at least five lens groups positioned in order from the object to the image side of the lens system, the first lens group being a positive lens consisting of a positive meniscus lens element convex to the object, the second lens group being a negative lens and consisting of two negative meniscus lens elements, the third lens group being a positive lens and consisting of in the order mentioned a thick positive lens element joined to a negative lens element, the fourth lens group being a positive lens and comprising at least a positive lens element and a negative lens element, and the fifth lens group being a positive lens and comprising at least two positive lens elements wherein the first positive lens element of said fifth group consists of a negative lens joined to a positive lens, and a diaphragm being interposed between said third lens group and said fourth lens group.

2. A wide angle photographic lens according to claim 1, further comprising a filter interposed between said second lens group and said third lens group.

3. A wide angle photographic lens according to claim 1, wherein the radii of curvature $r_1$ to $r_{18}$, the lens thickness or distance $d_1$ to $d_{17}$, and the ratio of the refractive index to the Abbe number $N_1/\nu_1$ to $N_{10}/\nu_{10}$ being substantially as given in the following table:

Aperture ratio 1 : 1.4   Angular field 95°

| lens # | Radius of Curvature r | Lens Thickness or Distance d | Refractive Index N/ Abbe No. ν |
|---|---|---|---|
| 1 | $r_1 = 290.595$ | $d_1 = 41.024$ | $N_1/\nu_1 = 1.61800/63.4$ |
| 1 | $r_2 = 867.896$ | $d_2 = 0.488$ | |
| 2 | $r_3 = 146.068$ | $d_3 = 5.854$ | $N_2/\nu_2 = 1.64000/60.2$ |
| 2 | $r_4 = 70.405$ | $d_4 = 43.805$ | |
| 3 | $r_5 = 164.917$ | $d_5 = 5.854$ | $N_3/\nu_3 = 1.61800/63.4$ |
| 3 | $r_6 = 66.983$ | | |
| filter | $\infty$ | 7.317 | 1.51633/64.1 |
| filter | | 2.439 | |
| | $\infty$ | | |
| 4 | $r_7 = 497.780$ | $d_7 = 9.756$ | $N_4/\nu_4 = 1.72000/50.2$ |
| 4 & 5 | $r_8 = 243.902$ | $d_8 = 70.732$ | $N_5/\nu_5 = 1.80518/25.4$ |
| 5 | $r_9 = -557.507$ | $d_9 = 13.659$ | |
| 6 | $r_{10} = 558.663$ | $d_{10} = 49.854$ | $N_6/\nu_6 = 1.72916/54.7$ |
| 6 | $r_{11} = -146.740$ | $d_{11} = 0.390$ | |
| 7 | $r_{12} = -369.015$ | $d_{12} = 6.829$ | $N_7/\nu_7 = 1.84666/23.9$ |

Aperture ratio 1 : 1.4   Angular field 94.5°

| Lens # | Radius of Curvature r | Lens Thickness or Distance d | Refractive Index N/ Abbe No. ν |
|---|---|---|---|
| 1 | $r_1 = 282.073$ | $d_1 = 38.390$ | $N_1/\nu_1 = 1.61800/63.4$ |
| 1 | $r_2 = 857.893$ | $d_2 = 0.488$ | |
| 2 | $r_3 = 141.907$ | $d_3 = 5.878$ | $N_2/\nu_2 = 1.64000/60.2$ |
| 2 | $r_4 = 68.712$ | $d_4 = 41.707$ | |
| 3 | $r_5 = 166.702$ | $d_5 = 5.854$ | $N_3/\nu_3 = 1.61800/63.4$ |
| 3 | $r_6 = 67.168$ | $d_6 = 24.878$ | |
| filter | $\infty$ | 7.317 | 1.51633/64.1 |
| filter | $\infty$ | 2.537 | |
| 4 | $r_7 = 484.917$ | $d_7 = 76.927$ | $N_4/\nu_4 = 1.80518/25.4$ |
| 4 & 5 | $r_8 = -250.893$ | $d_8 = 6.244$ | $N_5/\nu_5 = 1.71700/47.9$ |
| 5 | $r_9 = -574.546$ | $d_9 = 13.658$ | |
| 6 | $r_{10} = 551.585$ | $d_{10} = 47.659$ | $N_6/\nu_6 = 1.73400/51.5$ |
| 6 | $r_{11} = -150.249$ | $d_{11} = 0.390$ | |
| 7 | $r_{12} = -384.688$ | $d_{12} = 5.854$ | $N_7/\nu_7 = 1.84666/23.9$ |
| 7 | $r_{13} = 198.849$ | $d_{13} = 17.268$ | |
| 8 | $r_{14} = -1536.502$ | $d_{14} = 5.854$ | $N_8/\nu_8 = 1.84666/23.9$ |
| 8 & 9 | $r_{15} = 400.410$ | $d_{15} = 32.780$ | $N_9/\nu_9 = 1.69680/55.5$ |
| 9 | $r_{16} = -157.551$ | $d_{16} = 0.488$ | |
| 10 | $r_{17} = 322.741$ | $d_{17} = 26.366$ | $N_{10}/\nu_{10} = 1.77250/49.7$ |
| 10 | $r_{18} = -470.980$ | | | back focal length = 179.000
$F_{A.B} = -116.836$
$F_{A.B.C.D} = -237.079$
$d_{C.D} = 150.732$
Sum of Petzval = 0.090
All linear dimensions are given in millimeters.

4. A wide angle photographic lens system comprising at least five lens groups positioned in order from the object to the image side of the lens system, the first lens group being a positive lens consisting of a positive meniscus lens element convex to the object, the second lens group being a negative lens and consisting of two negative meniscus lens elements, the third lens group being a positive lens and consisting of in the order mentioned a negative lens element joined to a thick positive lens element, the fourth lens group being a positive lens and comprising at least a positive lens element and a negative lens element, and the fifth lens group being a positive lens and comprising at least two positive lens elements wherein the first positive lens element of said fifth lens group consists of a negative lens element joined to a positive lens element, and a diaphragm being interposed between said third lens group and said fourth lens group.

5. A wide angle photographic lens according to claim 4 further comprising a filter interposed between said second lens group and said third lens group.

6. A wide angle photographic lens according to claim 4, wherein the radii of curvature $r_1$ to $r_{18}$, the lens thickness or distance $d_1$ to $d_{17}$, and the ratio of the refractive index to the Abbe number $N_1/\nu_1$ to $N_{10}/\nu_{10}$ being substantially as given in the following table:

-continued

| lens # | Radius of Curvature r | Lens Thickness or Distance d | Refractive Index N/ Abbe No. ν |
|---|---|---|---|
| | Aperture ratio 1 : 1.4 | Angular field 95° | |
| 7 | $r_{13} = 194.379$ | $d_{13} = 17.024$ | |
| 8 | $r_{14} = -1876.346$ | $d_{14} = 5.805$ | $N_8/\nu_8 = 1.84666/23.9$ |
| 8 & 9 | $r_{15} = 539.834$ | $d_{15} = 29.512$ | $N_9/\nu_9 = 1.69680/55.5$ |
| 9 | $r_{16} = -166.635$ | $d_{16} = 0.488$ | |
| 10 | $r_{17} = 340.673$ | $d_{17} = 26.439$ | $N_{10}/\nu_{10} = 1.77250/49.7$ |
| 10 | $r_{18} = -375.661$ | | | back focal length = 178.161
$F_{A.B} = -117.288$
$F_{A.B.C.D} = -223.214$
$d_{C.D} = 151.220$
Sum of petzval = 0.097
All linear dimensions are given in millimeters.

7. A wide angle photographic lens system comprising at least five lens groups positioned in order from the object to the image side of the lens system, the first lens group being a positive lens consisting of a positive meniscus lens convex to the object, the second lens group being a negative lens and consisting of three negative meniscus lens elements each convex to the object, the third lens group being a positive lens and comprising at least a thick positive lens element, the fourth lens group being a positive lens and comprising at least a positive lens element and a negative lens element, and the fifth lens group being a positive lens and comprising at least two positive lens elements, and a diaphragm being interposed between said third lens group and said fourth lens group.

8. A wide angle photographic lens according to claim 5 further comprising a filter interposed between said second lens group and said third lens group.

9. A wide angle photographic lens according to claim 7, wherein said third lens group consists of in the order mentioned a negative lens element joined to said thick positive lens element.

10. A wide angle photographic lens according to claim 9, wherein the first positive lens element of said fifth lens group consists of a negative lens joined to a positive lens.

11. A wide angle photographic lens according to claim 10, wherein the radii of curvature $r_1$ to $r_{18}$, the lens thickness or distance $d_1$ to $d_{17}$, and the ratio of the refractice index to the Abbe number $N_1/\nu_1$ to $N_{10}/\nu_{10}$ being substantially as given in the following table:

| lens # | Radius of Curvature r | Lens Thickness or Distance d | Refractive Index N/ Abbe No. ν |
|---|---|---|---|
| | Aperture ratio 1 : 1.4 | Angular field 95° | |
| 1 | $r_1 = 349.515$ | $d_1 = 33.883$ | $N_1/\nu_1 = 1.61800/63.4$ |
| 1 | $r_2 = 1026.524$ | $d_2 = 0.485$ | |
| 2 | $r_3 = 134.820$ | $d_3 = 5.825$ | $N_2/\nu_2 = 1.61800/63.4$ |
| 2 | $r_4 = 76.010$ | $d_4 = 36.650$ | |
| 3 | $r_5 = 122.500$ | $d_5 = 5.825$ | $N_3/\nu_3 = 1.61800/63.4$ |
| 3 | $r_6 = 77.874$ | $d_6 = 15.631$ | |
| 4 | $r_7 = 160.796$ | $d_7 = 5.874$ | $N_4/\nu_4 = 1.61800/63.4$ |
| 4 | $r_8 = 79.277$ | $d_8 = 19.417$ | |
| filter | $\infty$ | 7.282 | 1.51633/64.1 |
| filter | $\infty$ | 2.427 | |
| 5 | $r_9 = 358.447$ | $d_9 = 10.874$ | $N_5/\nu_5 = 1.69680/55.5$ |
| 5 & 6 | $r_{10} = 277.141$ | $d_{10} = 78.350$ | $N_6/\nu_6 = 1.80518/25.4$ |
| 6 | $r_{11} = -611.117$ | $d_{11} = 13.592$ | |
| 7 | $r_{12} = 614.078$ | $d_{12} = 56.699$ | $N_7/\nu_7 = 1.72000/50.2$ |
| 7 | $r_{13} = -152.981$ | $d_{13} = 0.388$ | |
| 8 | $r_{14} = -465.534$ | $d_{14} = 5.825$ | $N_8/\nu_8 = 1.84666/23.9$ |
| 8 | $r_{15} = 198.544$ | $d_{15} = 15.243$ | |
| 9 | $r_{16} \infty$ | $d_{16} = 5.874$ | $N_9/\nu_9 = 1.84666/23.9$ |
| 9 & 10 | $r_{17} = 36.976$ | $d_{17} = 31.893$ | $N_{10}/\nu_{10} = 1.61800/63.4$ |
| 10 | $r_{18} = -162.636$ | $d_{18} = 0.485$ | |
| 11 | $r_{19} = 291.641$ | $d_{19} = 29.612$ | $N_{11}/\nu_{11} = 1.75700/47.9$ |
| 11 | $r_{20} = -449.447$ | | |

Back focal length = 181.155
$F_{A.B} = -108.554$
$F_{A.B.C.D} = -232.072$
$d_{C.D} = 165.728$
Sum of Petzval = 0.102
All linear dimensions are given in millimeters.

12. A wide angle photographic lens according to claim 9, wherein the second positive lens element of said fifth lens group consists of a negative lens joined to a positive lens.

13. A wide angle photographic lens according to claim 12, wherein the radii of curvature $r_1$ to $r_{18}$, the lens thickness or distance $d_1$ to $d_{17}$, and the ratio of the refractice index to the Abbe number $N_1/\nu_1$ to $N_{10}/\nu_{10}$ being substantially as given in the following table:

| Lens # | Radius of Curvature r | Lens Thickness or Distance d | Refractive Index N/ Abbe No. ν |
|---|---|---|---|
| | Aperture ratio 1 : 1.4 | Angular field 94.5° | |
| 1 | $r_1 = 427.020$ | $d_1 = 34.858$ | $N_1/\nu_1 = 1.61800/63.4$ |
| 1 | $r_2 = 1503.451$ | $d_2 = 0.485$ | |
| 2 | $r_3 = 139.474$ | $d_3 = 7.069$ | $N_2/\nu_2 = 1.62041/60.3$ |
| 2 | $r_4 = 77.004$ | $d_4 = 29.367$ | |
| 3 | $r_5 = 129.595$ | $d_5 = 5.908$ | $N_3/\nu_3 = 1.61800/63.4$ |
| 3 | $r_6 = 81.507$ | $d_6 = 15.705$ | |
| 4 | $r_7 = 148.761$ | $d_7 = 5.370$ | $N_4/\nu_4 = 1.62041/60.3$ |
| 4 | $r_8 = 75.801$ | $d_8 = 23.062$ | |
| filter | $\infty$ | 7.282 | 1.51633/64.1 |
| filter | $\infty$ | 1.876 | |
| 5 | $r_9 = 357.740$ | $d_9 = 10.712$ | $N_5/\nu_5 = 1.69350/53.3$ |
| 5 & 6 | $r_{10} = 382.976$ | $d_{10} = 79.048$ | $N_6/\nu_6 = 1.80518/25.4$ |
| 6 | $r_{11} = -713.896$ | $d_{11} = 13.592$ | |
| 7 | $r_{12} = 628.800$ | $d_{12} = 56.899$ | $N_7/\nu_7 = 1.72000/50.2$ |
| 7 | $r_{13} = -160.170$ | $d_{13} = 0.388$ | |
| 8 | $r_{14} = -723.035$ | $d_{14} = 5.819$ | $N_8/\nu_8 = 1.84666/23.9$ |
| 8 | $r_{15} = 189.463$ | $d_{15} = 16.275$ | |
| 9 | $r_{16} = 1358.156$ | $d_{16} = 47.573$ | $N_9/\nu_9 = 1.75700/47.9$ |
| 9 | $r_{17} = -197.235$ | $d_{17} = 0.485$ | |
| 10 | $r_{18} = 285.591$ | $d_{18} = 5.810$ | $N_{10}/\nu_{10} = 1.84666/23.9$ |
| 10 & 11 | $r_{19} = 180.289$ | $d_{19} = 33.113$ | $N_{11}/\nu_{11} = 1.61800/60.3$ |
| 11 | $r_{20} = -450.043$ | | |

Back focal length = 178.650
$F_{A.B} = -106.564$
$F_{A.B.C.D} = -223.914$
$d_{C.D} = 166.458$
Sum of Petzval = 0.082
All linear dimensions are given in millimeters.

14. A wide angle photographic lens according to claim 7, wherein said third lens group consists only of said thick positive lens element.

15. A wide angle photographic lens according to claim 14, wherein the second positive lens element of said fifth lens group consists of a negative lens joined to a positive lens.

16. A wide angle photographic lens according to claim 15, wherein the radii of curvature $r_1$ to $r_{18}$, the lens thickness or distance $d_1$ to $d_{17}$, and the ratio of the refractive index to the Abbe number $N_1/\nu_1$ to $N_{10}/\nu_{10}$ being substantially as given in the following table:

| Lens # | Radius of Curvature r | Lens Thickness or Distance d | Refractive Index N/ Abbe No. ν |
|---|---|---|---|
| | Aperture ratio 1 : 1.4 | Angular field 94.5° | |
| 1 | $r_1 = 427.020$ | $d_1 = 34.858$ | $N_1/\nu_1 = 1.61800/63.4$ |
| 1 | $r_2 = 1503.451$ | $d_2 = 0.485$ | |
| 2 | $r_3 = 139.474$ | $d_3 = 7.069$ | $N_2/\nu_2 = 1.62041/60.3$ |
| 2 | $r_4 = 77.004$ | $d_4 = 29.367$ | |

-continued

Aperture ratio 1 : 1.4    Angular field 94.5°

| Lens # | Radius of Curvature r | Lens Thickness or Distance d | Refractive Index N/ Abbe No. $\nu$ |
|---|---|---|---|
| 3 | $r_5 = 129.595$ | $d_5 = 5.908$ | $N_3/\nu_3 = 1.61800/63.4$ |
| 3 | $r_6 = 81.507$ | $d_6 = 15.705$ | |
| 4 | $r_7 = 148.761$ | $d_7 = 5.370$ | $N_4/\nu_4 = 1.62041/60.3$ |
| 4 | $r_8 = 75.801$ | $d_8 = 23.062$ | |
| filter | $\infty$ | 7.282 | 1.51633/64.1 |
| filter | $\infty$ | 1.876 | |
| 5 | $r_9 = 357.740$ | $d_9 = 89.760$ | $N_5/\nu_5 = 1.78472/25.7$ |
| 5 | $r_{10} = -674.300$ | $d_{10} = 13.592$ | |
| 6 | $r_{11} = 628.800$ | $d_{11} = 56.899$ | $N_6/\nu_6 = 1.72000/50.2$ |
| 6 | $r_{12} = -160.350$ | $d_{12} = 0.388$ | |
| 7 | $r_{13} = -723.035$ | $d_{13} = 5.819$ | $N_7/\nu_7 = 1.84666/23.9$ |
| 7 | $r_{14} = 189.677$ | $d_{14} = 16.275$ | |
| 8 | $r_{15} = 1358.156$ | $d_{15} = 47.573$ | $N_8/\nu_8 = 1.75700/47.9$ |
| 8 | $r_{16} = -197.417$ | $d_{16} = 0.485$ | |
| 9 | $r_{17} = 285.591$ | $d_{17} = 5.810$ | $N_9/\nu_9 = 1.84666/23.9$ |
| 9 & 10 | $r_{18} = 180.289$ | $d_{18} = 33.113$ | $N_{10}/\nu_{10} = 1.61800/60.3$ |
| 10 | $r_{19} = -450.927$ | | |

Back focal length = 178.806
$F_{A.B} = -106.564$
$F_{A.B.C.D} = -223.914$
$d_{C.D} = 166.458$
Sum of Petzval = 0.084
All linear dimensions are given in millimeters.

17. A wide angle photographic lens according to claim 14, wherein the first positive lens of said fifth lens group consists of a negative lens element joined to a positive lens.

18. A wide angle photographic lens according to claim 17, wherein the radii of curvature $r_1$ to $r_{18}$, the lens thickness or distance $d_1$ to $d_{17}$, and the ratio of the refractive index to the Abbe number $N_1/\nu_1$ to $N_{10}/\nu_{10}$ being substantially as given in the following table:

Aperture ratio 1 : 1.4    Angular field 95°

| Lens # | Radius of Curvature r | Lens Thickness or Distance d | Refractive Index N/ Abbe No. $\nu$ |
|---|---|---|---|
| 1 | $r_1 = 349.515$ | $d_1 = 33.883$ | $N_1/\nu_1 = 1.62041/60.3$ |
| 1 | $r_2 = 1019.316$ | $d_2 = 0.485$ | |
| 2 | $r_3 = 134.820$ | $d_3 = 5.825$ | $N_2/\nu_2 = 1.61800/63.4$ |
| 2 | $r_4 = 76.000$ | $d_4 = 36.650$ | |
| 3 | $r_5 = 122.578$ | $d_5 = 5.825$ | $N_3/\nu_3 = 1.61800/63.4$ |
| 3 | $r_6 = 77.949$ | $d_6 = 15.631$ | |
| 4 | $r_7 = 160.757$ | $d_7 = 5.874$ | $N_4/\nu_4 = 1.61800/63.4$ |
| 4 | $r_8 = 79.284$ | $d_8 = 19.417$ | |
| filter | $\infty$ | 7.282 | 1.51633/64.1 |
| filter | $\infty$ | 2.427 | |
| 5 | $r_9 = 351.942$ | $d_9 = 89.223$ | $N_5/\nu_5 = 1.80518/25.4$ |
| 5 | $r_{10} = -589.338$ | $d_{10} = 13.592$ | |
| 6 | $r_{11} = 613.859$ | $d_{11} = 56.699$ | $N_6/\nu_6 = 1.71700/47.9$ |
| 6 | $r_{12} = -152.055$ | $d_{12} = 0.388$ | |
| 7 | $r_{13} = -465.534$ | $d_{13} = 5.825$ | $N_7/\nu_7 = 1.84666/23.9$ |
| 7 | $r_{14} = 198.267$ | $d_{14} = 15.243$ | |
| 8 | $r_{15} = \infty$ | $d_{15} = 5.874$ | $N_8/\nu_8 = 1.84666/23.9$ |
| 8 & 9 | $r_{16} = 387.102$ | $d_{16} = 31.893$ | $N_9/\nu_9 = 1.61800/63.4$ |
| 9 | $r_{17} = -162.626$ | $d_{17} = 0.485$ | |
| 10 | $r_{18} = 291.748$ | $d_{18} = 29.612$ | $N_{10}/\nu_{10} = 1.75700/47.9$ |
| 10 | $r_{19} = -447.530$ | | |

Back focal length = 180.966
$F_{A.B} = -108.554$
$F_{A.B.C.D} = -232.072$
$d_{C.D} = 165.727$
Sum of Petzval = 0.105
All linear dimensions are given in millimeters.

19. A wide angle photographic lens according to claim 14, wherein the fifth lens group consists of only said two positive lens elements.

20. A wide angle photographic lens according to claim 19, wherein the radii of curvature $r_1$ to $r_{18}$, the lens thickness or distance $d_1$ to $d_{17}$, and the ratio of the refractive index to the Abbe number $N_1/\nu_1$ to $N_{10}/\nu_{10}$ being substantially as given in the following table:

Aperture ratio 1 : 1.4    Angular field 94°

| Lens # | Radius of Curvature r | Lens Thickness or Distance d | Refractive Index N/ Abbe No. $\nu$ |
|---|---|---|---|
| 1 | $r_1 = 408.859$ | $d_1 = 35.151$ | $N_1/\nu_1 = 1.61800/63.4$ |
| 1 | $r_2 = 1326.694$ | $d_2 = 0.485$ | |
| 2 | $r_3 = 142.718$ | $d_3 = 5.828$ | $N_2/\nu_2 = 1.61800/63.4$ |
| 2 | $r_4 = 78.421$ | $d_4 = 32.426$ | |
| 3 | $r_5 = 128.290$ | $d_5 = 5.865$ | $N_3/\nu_3 = 1.61800/63.4$ |
| 3 | $r_6 = 81.441$ | $d_6 = 18.980$ | |
| 4 | $r_7 = 161.794$ | $d_7 = 5.842$ | $N_4/\nu_4 = 1.61800/63.4$ |
| 4 | $r_8 = 78.193$ | $d_8 = 22.788$ | |
| filter | $\infty$ | 7.282 | 1.51633/64.1 |
| filter | $\infty$ | 0.485 | |
| 5 | $r_9 = 325.243$ | $d_9 = 88.180$ | $N_5/\nu_5 = 1.80518/25.4$ |
| 5 | $r_{10} = -381.074$ | $d_{10} = 13.592$ | |
| 6 | $r_{11} = 807.840$ | $d_{11} = 60.410$ | $N_6/\nu_6 = 1.72916/54.7$ |
| 6 | $r_{12} = -156.014$ | $d_{12} = 0.388$ | |
| 7 | $r_{13} = -497.315$ | $d_{13} = 7.661$ | $N_7/\nu_7 = 1.92286/20.9$ |
| 7 | $r_{14} = 194.265$ | $d_{14} = 15.638$ | |
| 8 | $r_{15} = -4152.361$ | $d_{15} = 34.213$ | $N_8/\nu_8 = 1.72916/54.7$ |
| 8 | $r_{16} = -187.957$ | $d_{16} = 0.485$ | |
| 9 | $r_{17} = 336.916$ | $d_{17} = 22.550$ | $N_9/\nu_9 = 1.72916/54.7$ |
| 9 | $r_{18} = -403.796$ | | |

Back focal length = 179.427
$F_{A.B} = -106.564$
$d_{C.D} = 170.231$
Sum of Petzval = 0.099
All linear dimensions are given in millimeters.
$F_{A.B.C.D} = -223.914$

* * * * *